United States Patent [19]

Kobayashi et al.

[11] Patent Number: 5,205,797

[45] Date of Patent: Apr. 27, 1993

[54] TORQUE DISTRIBUTION CONTROL SYSTEM FOR A FOUR-WHEEL DRIVE MOTOR VEHICLE

[75] Inventors: Toshio Kobayashi, Tokyo; Takao Omata, Uenohara, both of Japan

[73] Assignee: Fuji Jukogyo Kabushiki Kaisha, Tokyo, Japan

[21] Appl. No.: 586,518

[22] Filed: Sep. 21, 1990

[30] Foreign Application Priority Data

Oct. 20, 1989 [JP] Japan .................................. 1-274592
Oct. 20, 1989 [JP] Japan .................................. 1-274593

[51] Int. Cl.⁵ .......................................... B60K 17/346
[52] U.S. Cl. ............................... 475/221; 475/249
[58] Field of Search ............... 475/221, 225, 248, 249, 475/253; 74/558, 560

[56] References Cited

U.S. PATENT DOCUMENTS

| | | | |
|---|---|---|---|
| 3,254,543 | 6/1966 | Donath | 475/225 X |
| 4,677,873 | 7/1987 | Eastman et al. | 475/221 X |
| 4,779,699 | 10/1988 | Hatano | 475/221 X |
| 4,860,612 | 8/1989 | Dick et al. | 475/221 X |
| 5,066,268 | 11/1991 | Kobayashi | 475/249 |
| 5,071,396 | 12/1991 | Kobayashi | 475/221 X |
| 5,080,641 | 1/1992 | Kobayashi | 475/249 |
| 5,083,988 | 1/1992 | Kobayashi et al. | 475/249 |
| 5,098,351 | 3/1992 | Kobayashi | 475/221 X |

FOREIGN PATENT DOCUMENTS

| | | | |
|---|---|---|---|
| 279717 | 8/1988 | European Pat. Off. | 475/249 |
| 60-159444 | 8/1985 | Japan . | |
| 63-176728 | 7/1988 | Japan . | |
| 115042 | 8/1918 | United Kingdom | 475/248 |

Primary Examiner—Leslie A. Braun
Assistant Examiner—Ryan W. Massey
Attorney, Agent, or Firm—Martin A. Farber

[57] ABSTRACT

A planetary gear device as a central differential is provided. The planetary gear device has a first sun gear connected to an output shaft of a transmission, a carrier, first and second planetary pinions rotatably supported on the carrier through a shaft, and a second sun gear. The first planetary pinion is engaged with the first sun gear, and the second planetary pinion is engaged with the second sun gear. Each of the sun gears and the planetary pinions is arranged such that resultant force produced by a separative load and a tangential load at a contact point of the pinion and the sun gear is exerted on a bearing on the shaft, so that friction at the bearing produces a differential operation restricting torque.

7 Claims, 9 Drawing Sheets

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential in a form of a complex planetary gear device.

In the four-wheel drive motor vehicle, a torque distribution ratio of front and rear wheels is determined in accordance with a dynamic load ratio of the front and rear wheels and with movement of the center of gravity of the vehicle at acceleration so that the power of the an engine may be most effectively used.

In the four-wheel drive vehicle based on front-drive with a front-mounted engine, the ratio of the front torque $T_F$ to the front wheels and the rear torque $T_R$ to the rear wheels is approximately 50:50 (TF:TR≈50:50). In the four-wheel drive vehicle based on rear-drive with a front-mounted engine, the ratio of the front torque $T_F$ to the rear torque $T_R$ is approximately 40:60 (TF:TR≈40:60). A central differential comprising bevel gears is provided in the former system in which the output torque of the engine is equally distributed, and a central differential having a simple planetary gear device is provided in the latter system.

The former system ensures safe driving on a slippery road. If a differential lock device is provided for locking the central differential, the driveability of the vehicle is improved. However, when the vehicle makes a turn at high speed under the differential lock condition, all of four wheels may slip (i.e. the vehicle spins) at the same time, causing difficult driving.

In order to ensure driving stability of the vehicle, the torque to the rear wheels is set to a value larger than that to the front wheels by arranging the central differential comprising the simple planetary gear device, so that first the rear wheels may slip. Thus, the vehicle can be safely driven by the front wheels at a small torque while the rear wheels do not drive.

Japanese Patent Application Laid-Open 63-176728 discloses a four-wheel drive motor vehicle in which a central differential comprising a simple planetary gear device is provided. The output of the transmission is transmitted to a carrier of the planetary gear device. The torque is distributed to the front wheels through either a sun gear or a ring gear and to the rear wheels through the other gear. The torque to the front and rear wheels is unequally distributed at a ratio determined by the difference between the pitch circles of the sun gear and the ring gear. A fluid operated multiple-disk friction clutch as a lock device is provided for controlling the differential operation. The clutch comprises a drive drum and a driven drum each having multiple-disks, and a piston oil chamber formed between the drive drum and a piston. An electronic control system and a hydraulic control system are provided for controlling the pressure of oil. When oil is supplied to the piston chamber, the piston is urged by the pressure of the oil to push the disks of the drive drum. Thus, the opposite disks are engaged to produce a torque for restricting the differential operation.

Japanese Patent Application Laid-Open 60-159444 discloses a system for controlling a differential without electronic and hydraulic control systems. The differential comprises a worm gear and a worm wheel provided between right and left wheels or between the front and rear wheels for permitting the differential operation when a motor vehicle makes a turn. When the vehicle travels on a straight road, the differential is locked because of the irreversible function of the worm gear.

In the former system, the system is complicated in construction and becomes large in size because of the hydraulic control system and the electronic control system including a solenoid operated control valve for operating the clutch. Since the pressurized oil is supplied to the clutch for actuating the clutch to restrict the differential operation, a time lag inevitably occurs in the clutch operation. If the length of a hydraulic circuit in the hydraulic system is long, the response in operation is deteriorated, which decreases driveability of the vehicle. Furthermore, the differential operation is largely changed in accordance with fluctuation of the friction between the drive disks and driven disks. Therefore, it is desired to accurately control the pressure of the oil in accordance with driving conditions of the vehicle.

In the latter system, since the worm gear is used, the structure of the differential is complicated so that manufacturing cost increases. Further, since the worm gear device has a large sliding resistance, transmission efficiency reduces and wear of the gears increases. The system can not use the same oil of the transmission system the actuating oil so that the system is not provided in the transmission system.

SUMMARY OF THE INVENTION

An object of the present invention is to provide a torque distribution control system for a four-wheel drive motor vehicle in which a central differential is provided with a complex planetary gear device for sufficiently restricting differential operation.

Another object of the present invention is to provide a system in which the torque distribution at cornering of the vehicle and at slipping of the wheels is properly controlled by restricting the differential operation of the central differential, thereby improving steerability, driveability, and driving stability, and preventing the slipping of the wheels.

A further object of the present invention is to provide a system which enables control of a wide torque distribution range with a fluid operated friction clutch.

According to the present invention, there is provided a system for controlling a torque distribution to front wheels and rear wheels of a motor vehicle, having a central differential for transmitting output of a transmission to front and rear wheels, the system comprising the cental differential comprising a planetary gear device including a first sun gear, a carrier, first and second planetary pinions integral with each other and rotatably supported on a shaft secured to the carrier, and a second sun gear, the first planetary pinion being engaged with the first sun gear, and the second planetary pinion being engaged with the second sun gear.

Each of the sun gears and the planetary pinions is arranged such that a composite force produced by a separative load and a tangential load at a contact point of the pinion and the sun gear exerts on a bearing on the shaft through the corresponding planetary pinion, whereby friction at the bearing produces a differential operation restricting torque.

Each of the sun gears and the planetary pinions is a helical gear, each helix angle of the helical gear is determined such that the difference between a thrust load on the first planetary pinion and the thrust load on the second planetary pinion acts to produce a friction between an end of one of the pinions and an outside bearing member.

Further according to the invention the total reduction ratio of a front-wheel driving system of the vehicle is larger than the total reduction ratio of a rear-wheel driving system.

Other objects and features of the present invention will become understood from the following description with reference to the accompanying drawings.

DETAILED DESCRIPTION OF THE PREFERRED EMBODIMENTS

Figure 1:
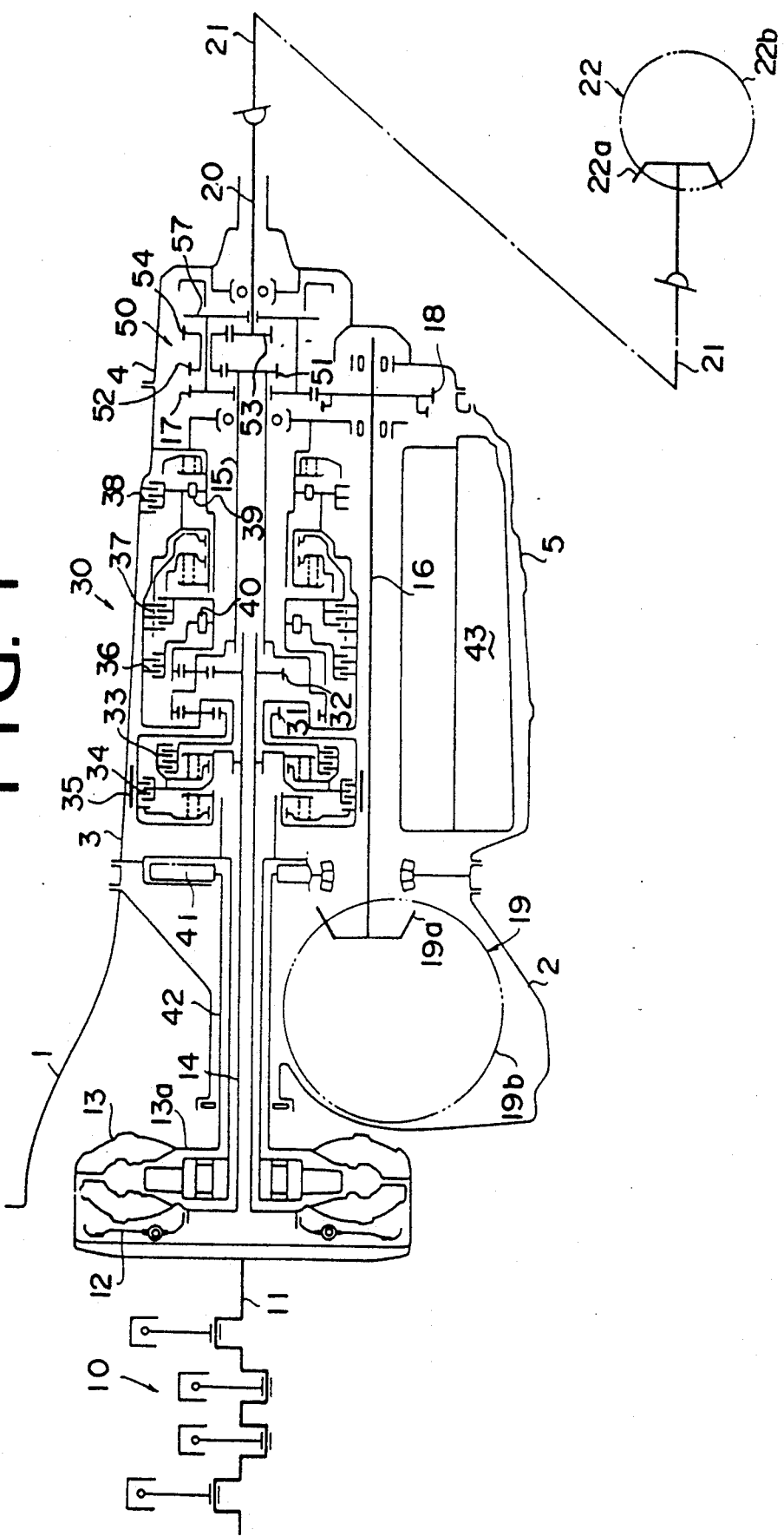
FIG. 1 is a schematic diagram showing a power transmission system for a four-wheel drive motor vehicle according to the present invention.

FIG. 1 shows a power transmission system in a transaxle type for a four-wheel drive motor vehicle having an engine 10 at a front portion thereof. The power transmission system has a torque converter 13 with a lockup clutch 12 mounted in a converter box 1, and a front differential 19 mounted in a differential box 2 behind the torque converter 13. A transmission case 3 housing an automatic transmission 30 is attached to the rear of the differential box 2. An oil pan 5 is attached under the transmission case 3. A crankshaft 11 of the engine 10 is operatively connected with the torque converter 13. An input shaft 14 extends from a turbine of the torque converter 13 to the automatic transmission 30. An output of the automatic transmission 30 is transmitted to an output shaft 15 which is aligned with the input shaft 14 for rearwardly transmitting the torque. The output shaft 15 is connected to a front drive shaft 16 which is disposed in parallel under the automatic transmission 30 through a pair of reduction gears 17 and 18 of a central differential 50 housed in a transfer case 4. The front drive shaft 16 is connected to front wheels of the vehicle through the front differential 19. The output shaft 15 is connected to a rear drive shaft 20 through the central differential 50. The rear drive shaft 20 is connected to rear wheels of the vehicle through a propeller shaft 21 and a rear differential 22.

The automatic transmission 30 comprises two sets of single planetary gears consisting of a front planetary gear 31 and a rear planetary gear 32 for providing four forward speeds and one reverse speed. The automatic transmission has a high clutch 33, a reverse clutch 34, a brake band 35, a forward clutch 36, an overrunning clutch 37, a low and reverse clutch 38, and one-way clutches 39 and 40.

An oil pump 41 is provided in the front end of the transmission case 3. A pump drive shaft 42 is connected to an impeller 13a of the torque converter 13 and is operatively connected with a rotor of the oil pump 41.

In the oil pan 5, a control valve body 43 is provided for hydraulically actuating respective clutches and for a brake system of the transmission 30.

Figure 2:
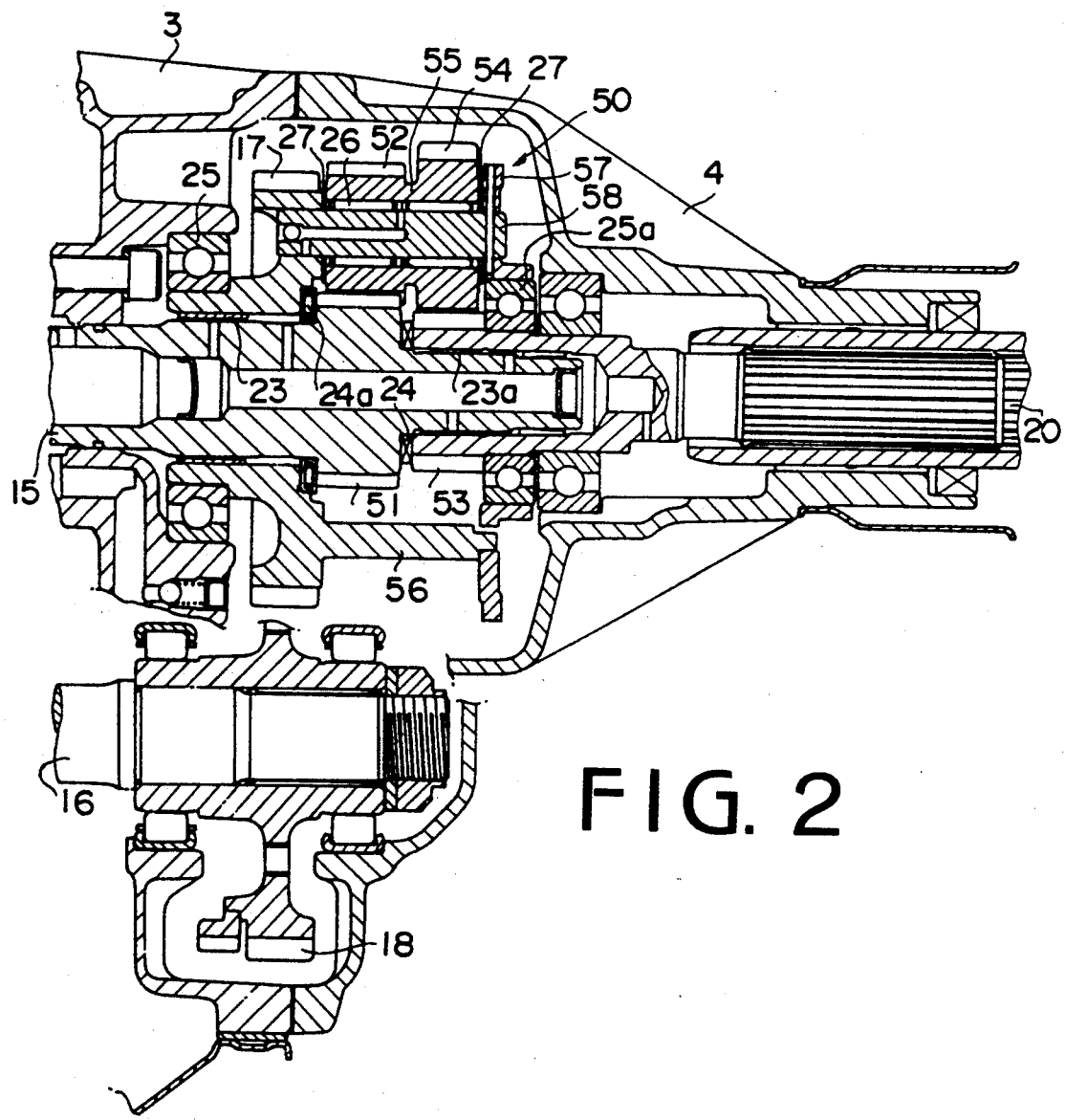
FIG. 2 is an enlarged sectional view showing a central differential of the system.

Referring to FIG. 2 showing the central differential 50, an end of the rear drive shaft 20 is rotatably mounted on the output shaft 15 through needle bearings 23a and a thrust bearing 24. The reduction gear 17 is rotatably mounted on the output shaft 15 through a needle bearing 23 and a thrust bearing 24a, and a boss of the reduction gear 17 is supported in the transmission case 3 through a bearing 25. The central differential 50 is disposed among the output shaft 15, the reduction gear 17 and the rear drive shaft 20.

The central differential 50 is a complex planetary gear device and comprises a first sun gear 51 integrally formed on the output shaft 15, a first planetary pinion 52 meshed with the first sun gear 51, a second sun gear 53 integrally formed on the rear drive shaft 20, a second planetary pinion 54 meshed with the second sun gear 53, and a carrier 57. The carrier 57 is rotatably mounted on the rear drive shaft 20 through a bearing 25a and connected to the reduction gear 17 by carrier connecting members 56 projected from the gear 17. The first and second planetary pinions 52 and 54 are integral with each other to form a combined pinion 55 and supported on a shaft 58 through needle bearings 26. The shaft 58 is secured to the gear 17 and the carrier 57. The combined pinion 55 is supported between the reduction gear 17 and the carrier 57 through thrust bearing washers 27 mounted on the shaft 58.

Thus, the output torque from the output shaft 15 of the transmission 30 is transmitted to the carrier 57 and the second sun gear 53 through the first sun gear 51 and pinions 52, 54 at predetermined respective torque distribution ratios. In the central differential 50, three combined pinions 55 are provided around the sun gears 51, 53 to form a complex planetary gear device without a ring gear.

Figure 3A:
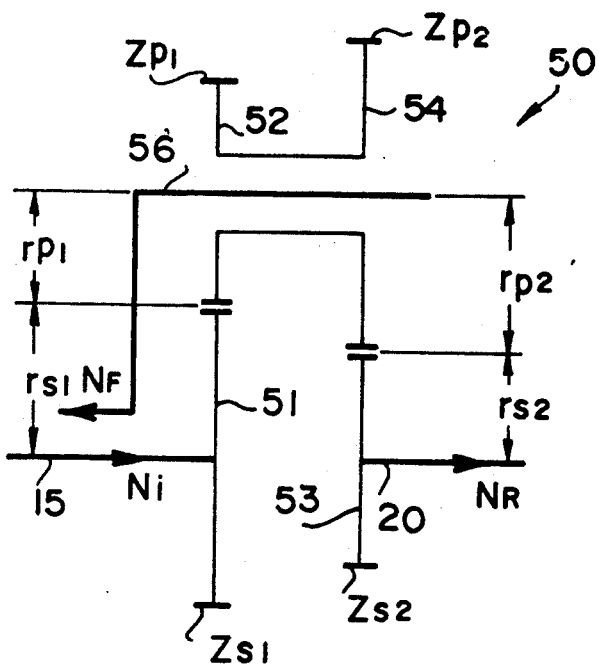
FIGS. 3a to 3c are explanatory illustrations for differential operation and torque distribution function.

In order to provide the differential operation, the number of teeth of each of the sun gears 51 and 53 and the pinions 52 and 54 is properly determined, which will be described hereinafter with reference to FIGS. 3a to 3c.

Figure 3B:
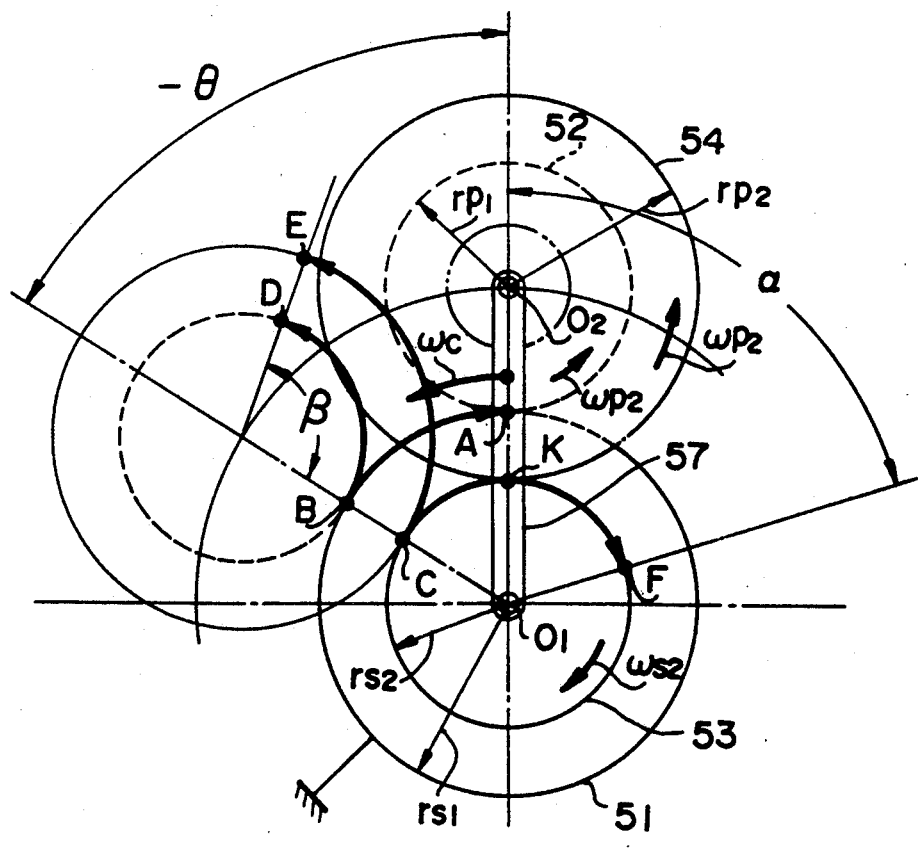

Referring to FIG. 3b, if the first sun gear 51 is fixed, the following relationship is obtained on a circumference of the second sun gear 53.

$$KF = -CF + CK \quad (1)$$

Figure 3C:
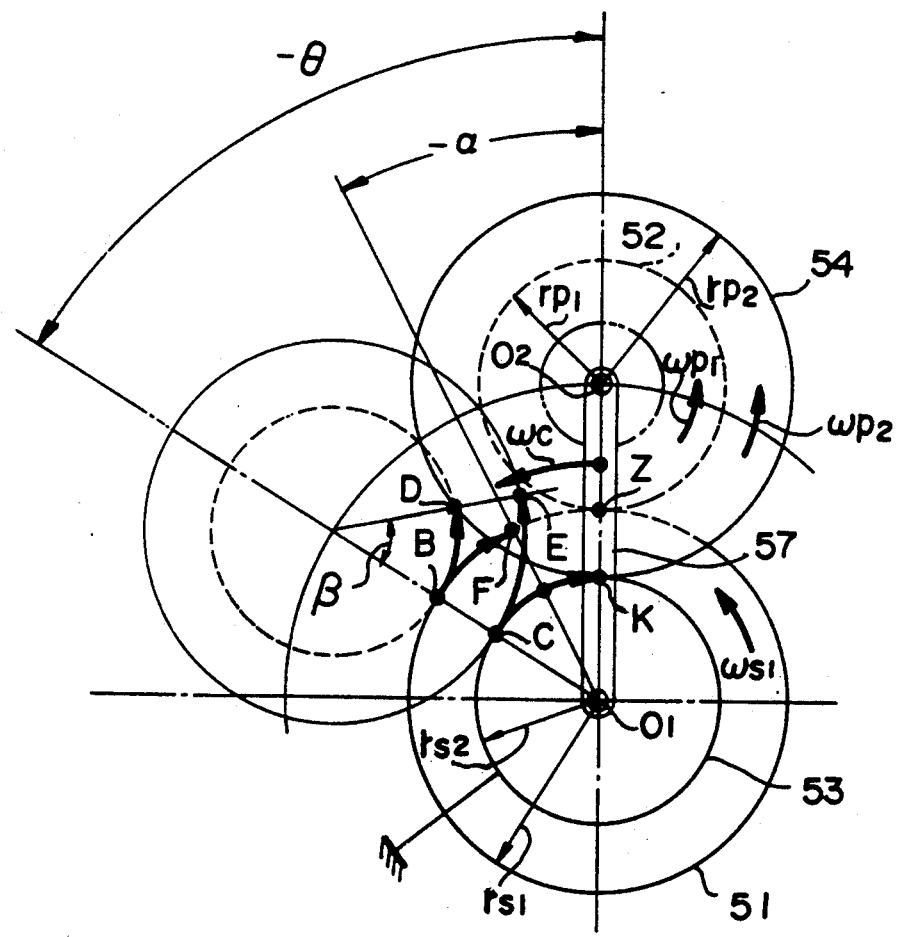

Referring to FIG. 3c, if the second sun gear 53 is fixed, the following relationship is obtained on the circumference of the first sun gear 51.

$$FZ = -BF + BZ \quad (2)$$

If the angular velocities of the first and second sun gears 51, 53 are $\omega S1$, $\Omega S2$, radii thereof are $rs1$, $rs2$, the angular velocities of the first and second pinions 52, 54 are $\omega p1$, $\omega p2$, radii thereof are $rp1$, $rp2$, and the angular velocity of the carrier 57 is $\omega c$, the equation (1) is expressed as $$\omega s2 \cdot rs2 = -\omega p2 \cdot rp2 + \omega c \cdot rs2 \quad (3)$$

The equation (2) is expressed as $$\omega s1 \cdot rs1 = -\omega p1 \cdot rp1 + \omega c \cdot rs1 \quad (4)$$

Since the first and second pinions 52, 54 are integral with each other, namely $\omega p1 = \omega p2$, the equations (3), (4) become $$\omega c(rs2 - rs1 \cdot rp2/rp1) = \omega s2 \times rs2 - \omega s1 \cdot rs1 \cdot rp2/rp1$$

If the angular velocity $\omega s1$ of the first sun gear 51 is replaced with an input speed Ni, the angular velocity $\omega c$ of the carrier 57 is replaced with a front wheel speed NF, the angular velocity $\omega s2$ of the second sun gear 53 is replaced with a rear wheel speed NR, and the radii rs1, rs2 of the sun gears 51, 53 and the radii rp1, rp2 of the pinions 52, 54 are replaced with the respective numbers of the teeth Zs1, Zs2, Zp1, Zp2, the above equation becomes $$NF(Zs2 - Zs1 \cdot Zp2/Zp1) = NR \times Zs2 - Ni \cdot Zs1 \cdot Zp2/Zp1$$

If $Zp1 = 21$, $Zp2 = 21$, $Zs1 = 30$ and $Zs2 = 18$;
$3 NR + 2 NF = 5 Ni$

Consequently, when the input speed $Ni \neq 0$, the input speed Ni, the front wheel speed NF and the rear wheel speed NR become $NR > Ni > NF$, or $NF > Ni > NR$.

Figure 4A:
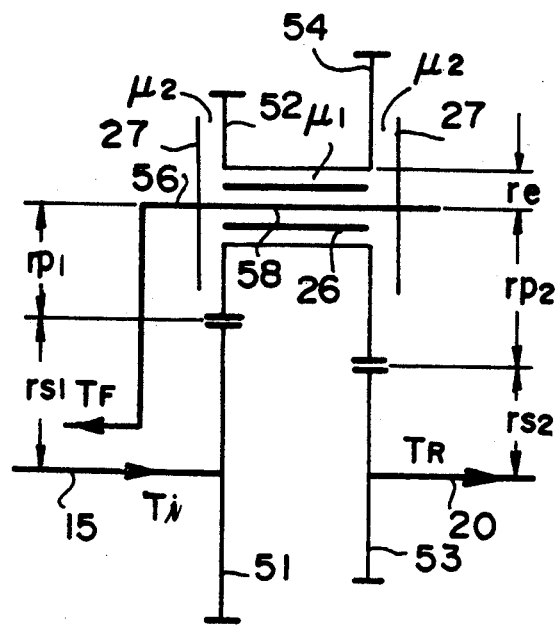
FIGS. 4a to 4d are the explanatory illustrations for differential operation restricting function.

The operation of the central differential 50 for distributing the torque to the front wheels and the rear wheels will be described hereinafter with reference to FIGS. 4a and 4b. In order to distribute a large standard torque to the rear wheels, the radii of the pitch circles of the sun gears 51 and 53 and the pinions 52 and 54 are properly determined.

The input torque Ti of the first sun gear 51 and the relationship between the sun gears 51 and the pinions 52 are expressed as follows, respectively.

$$Ti = T_F + T_R \quad (5)$$

$$rs_1 + rp_1 = rs_2 + rp_2 \quad (6)$$

where $T_F$ is the front torque transmitted from the carrier 57 to the front drive shaft 16, $T_R$ is the rear torque transmitted from the second sun gear 53 to the rear drive shaft 20, $rs_1$ is the radius of the pitch circle of the first sun gear 51, $rp_1$ and $rp_2$ are radii of the pitch circles of the first and second pinions 52 and 54, respectively, and $rs_2$ is the radius of the pitch circle of the second sun gear 53.

A tangential load P on the engaging point of the first sun gear 51 and the first pinion 52 is equal to the sum of a tangential load $P_1$ on the carrier 57 and a tangential load $P_2$ on the engaging point of the second sun gear 53 and the second pinion 54. That is, $$P = Ti/rs_1$$

$$P_1 = T_F/(rs_1 + rp_1)$$

$$P_2 = T_R/rs_2$$

$$Ti/rs_1 = \{(T_F/(rs_1 + rp_1))\} + T_R/rs_2 \quad (7)$$

Substituting equations (5) and (6) for the equation (7), $$T_F = (1 - rp_1 \cdot rs_2/rs_1 \cdot rp_2) \times Ti$$

$$T_R = (rp_1 \cdot rs_2/rs_1 \cdot rp_2) \times Ti$$

Consequently, it will be seen that the standard torque distribution for the front torque $T_F$ and the rear torque $T_R$ can be set to various values by changing the radii of the pitch circles of the sun gears 51 and 53 and the pinions 52 and 54.

If $rs_1$ is 23.824 mm, $rp_1$ is 16.676 mm, $rp_2$ is 21.807 mm and $rs_2$ is 18.693 mm, the front torque $T_F$ and the rear torque $T_R$ are calculated as $$T_F = 0.4 \cdot Ti$$

$$T_R = 0.6 \cdot Ti$$

Thus, the torque distribution ratio of the front wheels and the rear wheels is $$T_F : T_R \approx 40 : 60$$

A large standard torque can be distributed to the rear wheels.

The system of the central differential for restricting the differential operation will be described with reference to FIGS. 4a to 4d.

Figure 4B:
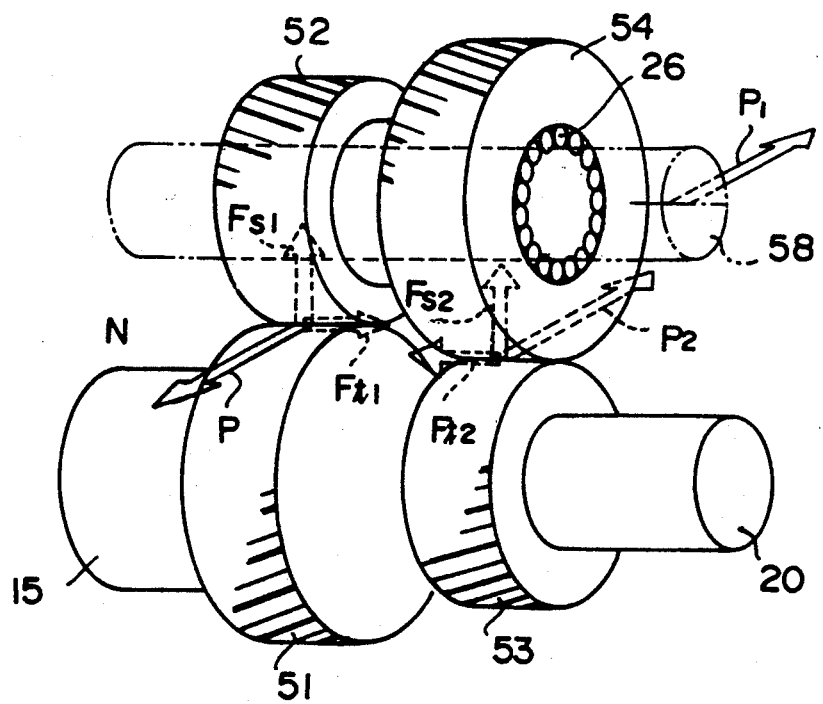

As shown in FIG. 4b, each of the first and second sun gears 51 and 53 and the first and second pinions 52 and 54 is a helical gear having a predetermined helix angle. The helix angles of the first and second pinions 52 and 54 are different from each other. A thrust load Ft1 is produced on a contact point of the first sun gear 51 and the first pinion 52 and a thrust load Ft2 is produced on a contact point of the second sun gear 53 and the second pinion 54. Both thrust loads Ft1 and Ft2 are exerted in the opposite directions of the shaft 58 so that sliding friction is produced on the thrust washers 27 by the difference between Ft1 and Ft2. A separative load Fs1 is produced on the contact point of the first gear train and a separative load Fs2 is produced on the contact point of the second gear train. A resultant force NP1 is produced by the separative load Fs1 and the tangential load P. Similarly, the separative load Fs2 and the tangential load P2 produce a resultant force NP2. Resultant forces NP1 and NP2 exert on the pinions 52 and 54, shaft 58 and the needle bearing 26 so that a rolling friction is produced. In accordance with these sliding and rolling frictions, a friction torque Tf, namely a differential operation restricting torque, is produced in the opposite direction to the rotating direction of the pinions.

Because the rotating direction of the pinions 52, 54 changes in accordance with the difference between the front-wheel speed NF and the rear-wheel speed NR, the differential operation restricting torque changes accordingly. Consequently, when $NF > NR$ at the cornering and slipping of the front wheels, and when $NF < NR$ at the slipping of the rear wheels, the torque distribution to the front wheels and the rear wheels is automatically controlled corresponding to the differential operation restricting torque.

Figure 4C:
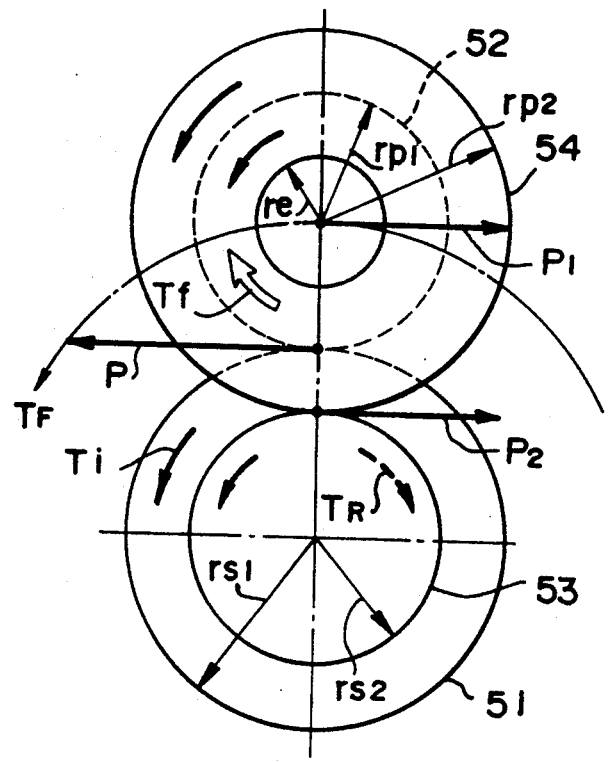

Referring to FIG. 4c, when $NF > NR$ and the input torque Ti is transmitted to the first sun gear 51 in a counterclockwise direction, the first and second pinions 52 and 54 are revolved in the same direction, and the second sun gear 53 and the carrier 57 are also rotated in the same direction. Thus, the friction torque Tf exerts on the pinions 52, 54 in a clockwise direction opposite to the pinions 52, 54. The separative load Fs1 and the thrust load Ft1 of the first gear train is expressed as $$Fs1 = P \cdot \tan\alpha 1/\cos\beta 1$$

$$Ft1 = P \cdot \tan\beta 1$$

where $\alpha 1$ is the pressure angle of the first pinion 52 and $\beta 1$ is the helix angle thereof. The resultant force $Np1$ exerted on the shaft 58 at the first gear train is $$Np1 = (P^2 + Fs1^2)^{\frac{1}{2}}$$
$$= P\{1 + (\tan\alpha 1/\cos\beta 1)^2\}^{\frac{1}{2}}$$

Similarly, the separative load $Fs2$ and the thrust load $Ft2$ of the second gear train are expressed as $$Fs2 = P2 \cdot \tan\alpha 2/\cos\beta 2$$

$$Ft2 = P2 \cdot \tan\beta 2$$

where $\alpha 2$ is the pressure angle of the second pinion 54 and $\beta 2$ is the helix angle thereof.

The resultant force $Np2$ exerted on the shaft 58 at the second gear train is $$Np2 = (P2^2 + Fs2^2)^{\frac{1}{2}}$$
$$= P2\{1 + (\tan\alpha 2/\cos\beta 2)^2\}^{\frac{1}{2}}$$

A residual thrust force $\Delta Ft$ produced in the first and second pinions 52 and 54 is expressed as $$\Delta Ft = Ft2 - Ft1$$
$$= P2 \cdot \tan\beta 2 - P \cdot \tan\beta 1$$

The friction torque $Tf$ is the sum of the frictions of the resultant forces $Np1$ and $Np2$ and the residual thrust force $\Delta Ft$, and expressed as $$Tf = \mu 1 \cdot re \cdot (Np1 + Np2) + \Delta Ft \cdot \mu 2 \cdot n \cdot$$
$$2/3 \cdot \{(rd^3 - re^3)/(rd^2 - re^2)\}$$

where $\mu 1$ is the rolling friction torque of the needle bearing 26, $\mu 2$ is the sliding friction torque of the thrust washer 27, $re$ is the inner radius of the pinion, $rd$ is the outer radius of the thrust washer, and $n$ is the number of the contact surfaces.

The balance of the torque in the first and second pinions 52 and 54 is expressed as $$Tf + P \cdot rp1 = P2 \cdot rp2$$

Since $$P = Ti/rs1$$

$$P1 = TF/(rs1 + rp1)$$
$$= TF/(rs2 + rp1)$$

$$P2 = TR/rs2$$

The above equation is represented as $$TR = Ti(rp1 \cdot rs2/rs1 \cdot rp2) + Tf \cdot rs2/rp2$$

Further, since $Ti = TF + TR$, the above equation is expressed as $$TF = Ti(1 - rp1 \cdot rs2/rs1 \cdot rp2) - Tf \cdot rs2/rp2$$

Here, if $\mu 1$ is 0, and $\mu 2$ is 0, $Tf$ becomes zero. Thus, the same standard torque distribution for the front torque TF and the rear torque TR is obtained.

Under such conditions, it is understood that the differential operation restricting torque $Tf \cdot rs2/rp2$ corresponds to the friction torque TF. The front torque TF becomes small and the rear torque TR becomes large in accordance with the differential operation restricting torque $Tf \cdot rs2/rp2$. Since the resultant forces $Np1$ and $Np2$ and the residual thrust force $\Delta Ft$ which produce the friction torque TF are proportional to the input torque, the differential operation is restricted in proportion to the input torque.

The residual thrust force $\Delta Ft$ increases in accordance with the difference between the helix angles $\beta 1$ and $\beta 2$ of the first and second pinions 52 and 54. If a bushing or a plane bearing is used in place of the needle bearing 26, the friction coefficient $\mu 1$ between the pinions and shaft 58 is increased. Thus, it is possible to increase the value of the differential operation restricting torque as well as the friction torque Tf.

Figure 4D:
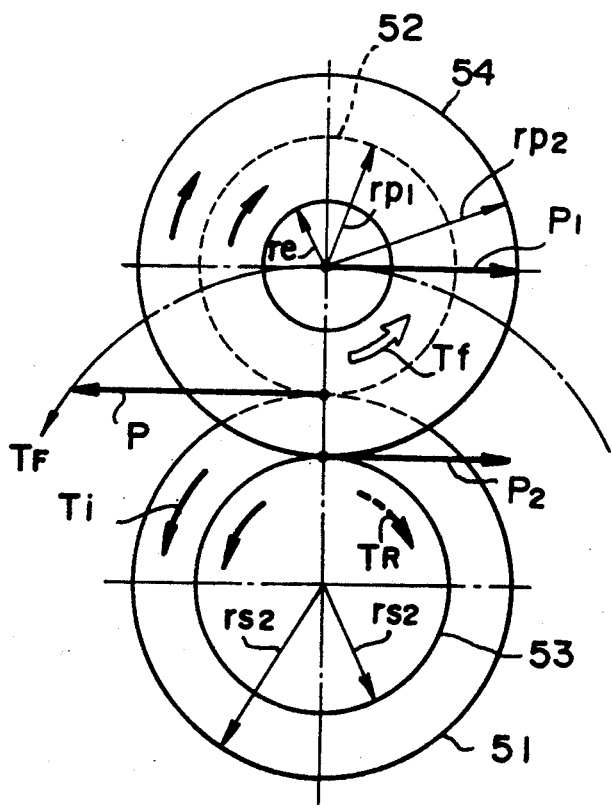

Referring to FIG. 4d, when NR > NF, the first and second pinions 52 and 54 revolve in the clockwise direction while rotating on the sun gears 51, 53, which is the opposite direction to the rotation of the sun gear 51. Thus, the friction torque Tf is exerted on the pinions 52, 54 in the coutnerclockwise direction.

The balance of the torque in the first and second pinions 52 and 54 is expressed as $$Tf + P2 \cdot rs2 = P \cdot rp1$$

Thus, the front and rear torque TF and TR are expressed as $$TF = Ti(1 - rp1 \cdot rs2/rs1 \cdot rp2) + Tf \cdot rs2/rp2$$

$$TR = Ti(rp1 \cdot rs2/rs1 \cdot rp2) - Tf \cdot rs2/rp2$$

Consequently, in the conditions, the same differential operation restricting torque $Tf \cdot rs2/rp2$ as the aforementioned is produced. However, the rear torque TR becomes small and the front torque TF becomes large in accordance with the differential operation restricting torque.

Describing the operation of the system, the power of the engine 10 is transmitted through the torque converter 13 and the input shaft 14 to the transmission 30 at which the transmission ratio is automatically controlled. The output of the transmission is transmitted to the first sun gear 51 of the central differential 50. The torque is transmitted to the reduction gear 17 through the carrier 57 and to the second sun gear 53.

Accordingly, the torque of the reduction gear 17 is transmitted to the front wheels through the reduction gear 18, the front drive shaft 16 and the front differential 19. The torque of the second sun gear 53 is transmitted to the rear wheels through the rear drive shaft 20, the propeller shaft 21 and the rear differential 22. Thus, a full-time four-wheel driving is established.

Figure 5:
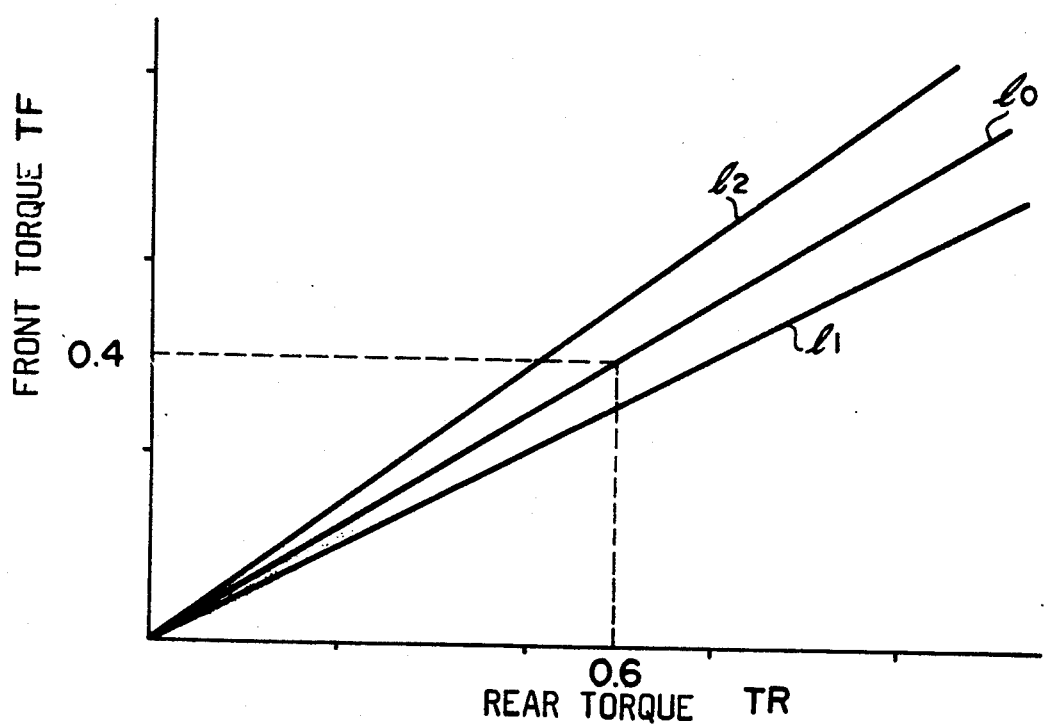
FIG. 5 is a graph showing a relationship between front torque and rear torque.

When NF = NR at straight-ahead running, the second sun gear 53 and the carrier 57 are rotated in the same direction at the same speed. Thus, the first and second pinions 52 and 54 revolve together with the carrier 57 without rotating, so that the friction torque is not generated. The front torque TF of the carrier 57 and the rear torque TR of the second sun gear 53 corresponding to the input torque Ti of the first sun gear 51 are determined in accordance with the standard torque distribution ratio TF:TR=40:60 only as shown by a curve 10 of FIG. 5.

At the standard torque distribution ratio, the vehicle is driven under the understeer condition, so that good operability is ensured.

If the vehicle is driven on a slippery road, the rear wheels slip first because the larger amount of the torque is distributed to the rear wheels.

When NF>NR in which the vehicle makes a turn or the front wheels slip, the pinions 52 and 54 are rotated to provide the differential operation of the central differential 50, so that the rotating difference in the speeds of the front and rear wheels is sufficiently absorbed, thereby preventing tight corner braking and ensuring good operability.

On the other hand, because of the rotation of the pinions 52 and 54, the thrust loads dependent on the difference between the helix angles are exerted on one side of the thrust washers 27 and the resultant forces by the separative loads and tangential loads are exerted on the needle bearing 26. Therefore, the friction torque is produced in the opposite direction to the rotating direction of the pinions, and hence the differential operation restricting torque is produced. The restricting torque is exerted on the carrier 57 against the rotation of the carrier. Thus, the torque corresponding to the restricting torque is transmitted to the rear wheels. The torque distribution ratio for the rear wheels becomes larger than the standard torque distribution ratio as shown by a curved line 11 of FIG. 5. Consequently, steerability and operability are improved and the slipping of the front wheels at straight-ahead running is prevented.

Furthermore, when NR>NF at the slipping of the rear wheels, the pinions 52 and 54 are rotated on the sun gears in accordance with the speed difference between the front wheels and the rear wheels. The restricting torque operates to urge the rotation of the carrier 57 so that the torque is transmitted to the front wheels. The torque distribution ratio of the front wheels becomes larger than the standard torque distribution ratio as shown by a curved line 12 of FIG. 5, thereby preventing the rear wheels from slipping.

Since the differential operation restricting torque is produced in proportion to the input torque, the predetermined split torque to the front and rear wheels varies with the restricting torque. Thus, the operation for restricting the differential operation is constantly performed.

Figure 6:
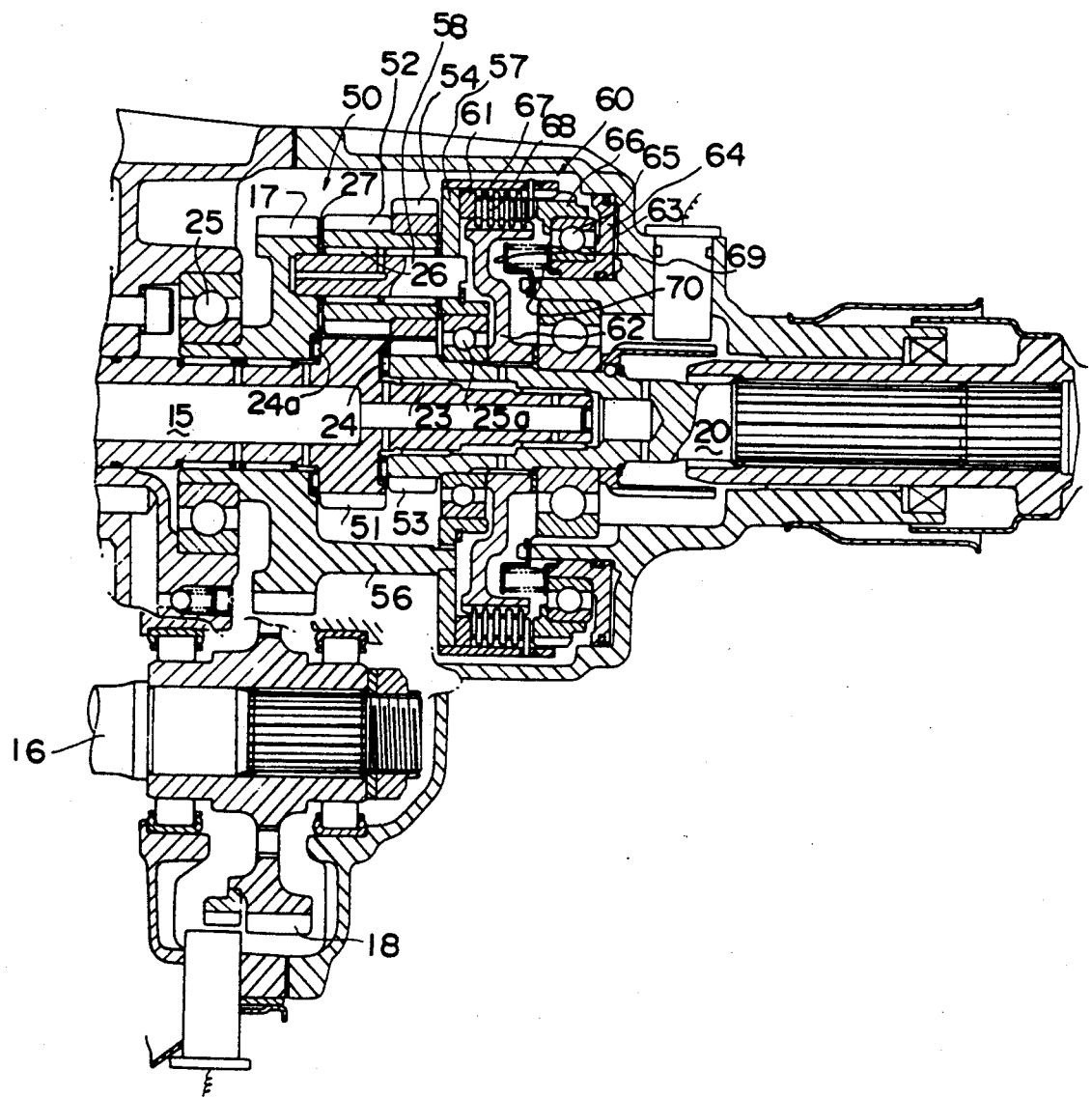
FIG. 6 is a sectional view showing a second embodiment of the present invention.

Referring to FIG. 6 showing another embodiment of the invention, the central differential 50 is provided with a fluid operated multiple-disk friction clutch 60 which is provided between the carrier 57 and the second sun gear 53.

The clutch 60 comprises a drive drum 61 secured to the carrier 57, a driven drum 62 secured to the rear drive shaft 20, a plurality of disks 67 splined on the drum 61, and a plurality of disks 68 splined on the drum 62, alternately arranged. A retainer 69 is mounted on an innermost portion of the transfer case 4. A piston 64 is slidably mounted in the transfer case 4. A pressure plate 66 is connected to the piston 64 through a bearing 65. An oil chamber 63 is formed between the piston 64 and the transfer case 4.

When oil is supplied to the chamber 63, the piston 64 is pushed against a spring 70 disposed between the piston 64 and the retainer 69 by the pressure of the oil. The pressure plate 66 pushes the disks 67 and 68 to engage the clutch 60 for producing a differential operation restricting clutch torque.

When NF>NR, the front torque TF and the rear torque TR are as follow in accordance with the restricting clutch torque Tc.

$$TF = 0.4\,Ti - 0.857\,Tf - Tc$$

$$TR = 0.6\,Ti + 0.857\,Tf + Tc$$

When NR>NF, the front torque TF and the rear torque TR are as follows.

$$TF = 0.4\,Ti + 0.857\,Tf + Tc\ ,$$

$$TR = 0.6\,Ti - 0.857\,Tf - Tc$$

In the second embodiment, at the slipping of the wheels, the restricting torque is produced in the central differential 50 without a time lag in accordance with the friction torque Tf and the restricting clutch torque Tc is produced in the clutch 60. When NF>NR, the torque corresponding to the clutch torque Tc is transmitted to the rear wheels. When NR>NF, the torque corresponding to the clutch torque Tc is transmitted to the front wheels. Thus, the differential operation is restricted by the friction torque Tf which is supplemented with the restricting clutch torque Tc so that it is possible to properly restrict the differential operation.

Figure 7:
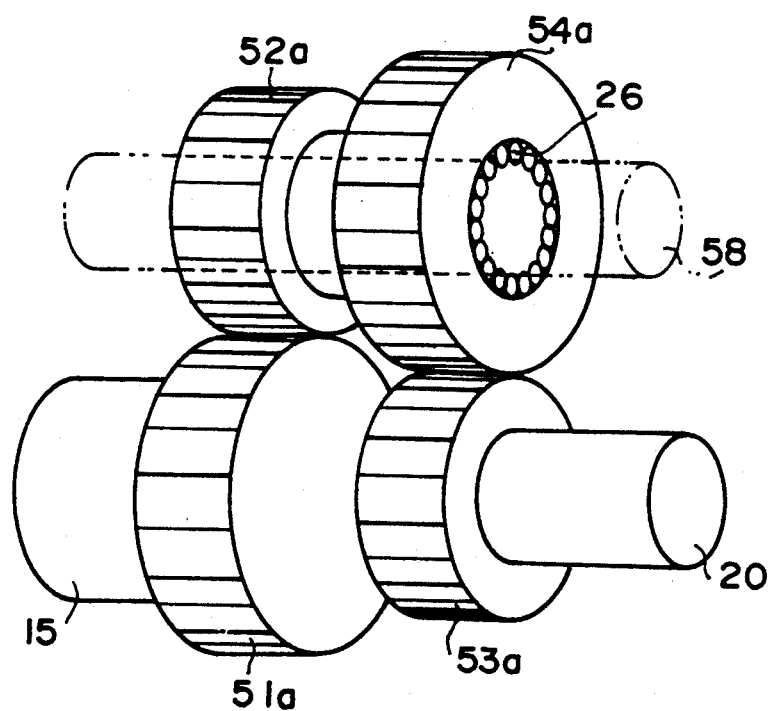
FIG. 7 is a perspective view showing a modification of a planetary gear assembly.

FIG. 7 shows a modification of the planetary gear assembly. In the modification, spur gears 51a to 54a are used in place of helical gears. The differential operation restricting torque is produced in accordance with the friction between the pinions and the needle bearing.

The system of the present invention can be employed in a four-wheel drive motor vehicle of other types such as the type of the front drive with a laterally mounted front engine, or the rear drive with a front engine, and a four-wheel drive motor vehicle having a manual transmission, or a continuously variable belt-drive automatic transmission.

In the above described embodiments, the differential operation restricting torque is not generated at the straight-ahead running of the vehicle, but is generated only when cornering of the vehicle and slipping of a wheel, which cause the differential operation. More particularly, at straight-ahead running, the torque is distributed to the front and rear wheels at the standard torque distribution ratio, and the planetary pinions 52 and 54 rotate at the same speed as the carrier 57 about the sun gears 51, 53. In order to solve such a problem, in a second modification, the differential is arranged to increase the rotating speed of the carrier 57 connected to the front wheels even if the front wheels and the rear wheels are driven at the same speed at the straight-ahead running, so that the combined pinion 55 comprising the pinions 52 and 54 rotates about the shaft 58. Thus, the restricting torque is produced in the differential which is transmitted to the rear wheels.

Here, the total reduction ratio iF of the front-wheel driving system and the total reduction ratio iR of the rear-wheel driving system extending from the central differential 50 are determined as follows.

$$iF = ZF2/ZF1 \cdot ZF4/ZF3$$

$$iR = ZR2/ZR1$$

where ZF1 is the number of the teeth of the reduction drive gear 17, ZF2 is the number of the teeth of the reduction driven gear 18, ZF3 is the number of the teeth of a drive pinion 19a of the front differential 19, ZF4 is the number of the teeth of a final gear 19b, ZR1 is the number of the teeth of a drive pinion 22a of the rear differential 22, and ZR2 is the number of the teeth of a final gear 22b. Thus, the total reduction ratio iF and iR are determined as iF>IR.

When NF=NR, the rotating speed of the carrier 57 is increased with iF/iR. When NF>NR at cornering, a rate for the increasing speed becomes (iF/iR)/(NF/NR). At cornering, the speed ratio between the front wheels and the rear wheels NF/NR is increased in dependency on the cornering radii, thereby increasing the increasing speed. It is necessary to consider the fluctuation of the effective radii and the wear of the tires of the front and rear wheels and the change of the effective radii of the tires caused by the movement of the center of gravity of the vehicle at acceleration. The speed ratio between the front wheels and the rear wheels is determined such that the front wheel speed NF and the rear wheel speed NR becomes NF>NR. Thus, the total reduction ratios are determined as iF/iR≧e when the rear wheels slip (NR>NF), the differential operation is effected when the condition becomes NR/NF>iF/iR.

In accordance with the present invention, the central differential comprises two pairs of the sun gears and the planetary pinions and the carrier. The system for restricting the differential operation is formed by arranging gears and pinions so that the loads exerted on the contact points of the pinions may be effected to restrict the differential operation. Thus, the construction of the system is simplified with a good transmitting efficiency compared with the system dependent on the worm gear device. Since the contact pressures at the contact points are small, it is advantageous for lubrication. Since the differential operation restricting torque is proportional to the input torque, it is easy to control the driving of the vehicle by operating the accelerator pedal of the vehicle.

The differential operation restricting torque can be determined in accordance with the difference between the friction coefficients of the washers and the pinions.

In the standard torque distribution, the large torque is transmitted to the rear wheels. Moreover, at cornering and slipping of the front wheels, the torque corresponding to the restricting torque is transmitted to the rear wheels, thereby improving steerability and operability of the vehicle. At slipping of the rear wheels, the torque is transmitted to the front wheels to prevent the slipping, thereby improving the driveability. The clutch can be used for supplementing the restricting torque in the differential with the restricting clutch torque so that the friction force is reduced to improve the transmitting efficiency.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system, for controlling a torque distribution to front wheels and rear wheels of a motor vehicle having a transmission, having a central differential operatively connected so as to transmit output of the transmission to the front and rear wheels, the system comprising:

said central differential comprising a planetary gear device including a first sun gear, a carrier, first and second planetary pinions integral with each other and rotatably supported on a shaft secured to the carrier, and a second sun gear, said first planetary pinion being engaged with said first sun gear, and said second planetary pinion being engaged with said second sun gear;

each of said sun gears and said planetary pinions being arranged such that a resultant force produced by a separative load and a tangential load at a contact point of the pinion and sun gear exerts on a bearing on said shaft through the corresponding planetary pinion, whereby a friction at said bearing produces a differential operation restricting torque; and each of said sun gears and said planetary pinions is a helical gear, each helix angle of the helical gears is determined such that the difference between a first thrust load on the first planetary pinion and a second thrust load on the second planetary pinion acts to produce a friction between an end of one of the pinions and an outside bearing member.

2. The system according to claim 1, wherein said outside bearing member is a washer mounted on said shaft.

3. The system according to claim 1, wherein a total reduction ratio of a front-wheel driving system of the vehicle is different from the total reduction ratio of a rear-wheel driving system.

4. The system according to claim 3, wherein the total reduction ratio of the front-wheel driving system is larger than that of the rear-wheel driving system.

5. A system for controlling torque distribution to front wheels and rear wheels of a motor vehicle having a transmission, a central differential operatively connected to an output shaft of the transmission and two drive shafts for transmitting output of the transmission to the front and rear wheels respectively, the system comprising:

a carrier provided on the central differential, first and second sun gears provided on the central differential coaxial with each other and mounted rotatably relative to said carrier respectively;

said central differential further comprising:

a carrier shaft secured to said carrier;

a first pinion engaged with said first sun gear;

a second pinion engaged with said second sun gear;

said first and second pinions securely connected to each other and rotatably supported on said carrier shaft;

one of said first and second sun gears and said carrier operatively connected to the output shaft and the others of said first and second sun gears and said carrier operatively connected to the drive shafts respectively;

an outside bearing member provided on said carrier shaft at each end of said pinions;

said fist and second pinions formed as helical gears having a first and second predetermined helix angle respectively; and said first and second predetermined helix angles are different from each other for producing a difference of thrust load between a first thrust load on the first pinion and a second thrust load on the second pinion to produce a friction between said end of one of said pinions and said outside bearing member so as to produce a differential operation restricting torque in accordance with the friction at said bearing member.

6. The system according to claim 5, wherein said outside bearing member is a washer mounted on said carrier shaft.

7. The system according to claim 5, wherein a total reduction ratio of a front-wheel driving system of the vehicle is different from the total reduction ratio of a rear-wheel driving system.

* * * * *